B. S. LACY.
SEPARATION OF THE CONSTITUENTS OF GASEOUS MIXTURES.
APPLICATION FILED SEPT. 20, 1916.
1,272,059.
Patented July 9, 1918.
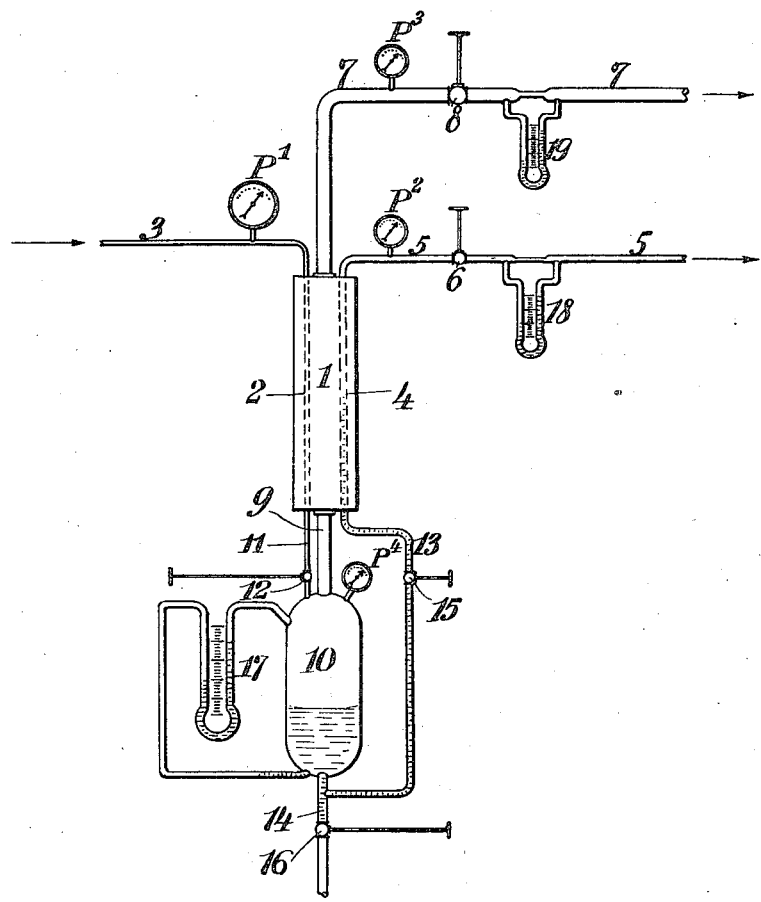
Burritt S. Lacy, Inventor
By his Attorney

UNITED STATES PATENT OFFICE.

BURRITT S. LACY, OF SEWAREN, NEW JERSEY, ASSIGNOR TO THE ROESSLER & HASS-LACHER CHEMICAL CO., OF NEW YORK, N. Y., A CORPORATION OF NEW YORK.

SEPARATION OF THE CONSTITUENTS OF GASEOUS MIXTURES.

1,272,059. Specification of Letters Patent. Patented July 9, 1918.

Application filed September 20, 1916. Serial No. 121,155.

*To all whom it may concern:*

Be it known that I, BURRITT S. LACY, a citizen of the United States of America, residing at Sewaren, in the county of Middlesex and State of New Jersey, have invented certain new and useful Improvements in the Separation of the Constituents of Gaseous Mixtures, of which the following is a specification.

This invention relates to the separation of the constitutents of gaseous mixtures, particularly of natural gas mixtures; and the chief object of the present invention is to improve the separation and to recover the latent heat of the liquefied portions as far as possible.

In all processes for the separation of the permanent gases by liquefaction of one or more of the constitutents it is desirable that the "cold" required to produce such liquefaction shall be as far as possible regenerated by reëvaporating the liquefied portion, in order that the initial source of cold, such as simple expansion of the compressed gas, the so-called Joule-Thomson effect, may be supplemented by this regenerated cold. It is well known that in many cases the regeneration is very effective, so much so that the initial cold necessary is substantially only that required to balance the radiation and conduction losses of the apparatus. In so far as the regeneration is incomplete, however, a larger quantity of initial cold is necessary, which means that expansion from a higher pressure is required, with consequent greater cost of construction and operation.

In the prior art the regeneration of the latent heat of the liquefied gas is usually attained by passing the incoming compressed gas on its way to the expansion valve through a pipe which is immersed in a vessel containing the liquefied portion, by which there is produced simultaneously evaporation of the liquid, and cooling of the compressed gas by a corresponding amount.

I have found, however, that the processes of the prior art are not satisfactory in their results on all gas mixtures, for example, their application to natural gas has not been found economically sufficient to warrant their utilization for the separation of methane from the other constituents of natural gas.

Thus for instance unsatisfactory results are obtained by the application of the methods of the prior art to the separation of the methane in a relatively pure condition, apart from a small nitrogen content, from the less volatile constitutents as they are usually found in the natural gas of Pennsylvania or West Virginia. An average gas of this region, as shown by Burrell and Seibert's analysis of the gas furnished the city of Pittsburgh, (*Jn. Am. Chem. Soc.* 1914, vol. 36, p. 1537) has a composition about as follows:—

| | | | |
|---|---|---|---|
| 1.6% by volume | $N_2$ | (B. P. $-195°$ C.) |
| 84.7% " | " | $CH_4$ | (B. P. $-160°$ C.) |
| 9.4% " | " | $C_2H_6$ | (B. P. $-89°$ C.) |
| 3.0% " | " | $C_3H_8$ | (B. P. $-35°$ C.) |
| 1.3% " | " | $C_4H_{10}$ | (B. P. $0°$ C.) chiefly. |
| 100.0% | | | |

With such a gas a large proportion of the $C_4H_{10}$ and $C_3H_8$, together with more or less $C_2H_6$, is not reëvaporated by the incoming compressed gas according to the methods of the prior art, because of the relatively high boiling points of these constituents; in this respect the problem differs essentially from that of the separation of air into oxygen (B. P.—$183°$ C.) and nitrogen (B. P.—$195°$ C.) where there are no such high boiling constituents. Consequently these hydrocarbons accumulate in the vessel, and have to be drawn off as cold liquid, while the regeneration of cold is correspondingly incomplete, and the process therefore uneconomical.

I have discovered a method by which even with such gas mixtures as contain constituents of relatively high boiling points an efficient regeneration of cold may be attained while at the same time obtaining the low-boiling constitutents in a state of high purity and for the better understanding of my invention, by way of example, I shall describe my method as practised in connection with an apparatus with which I may carry out my invention, reference being had to the accompanying drawing which illustrates the apparatus in a diagrammatic way.

In the drawing 1 denotes a so-called "exchanger" wherein two systems of small bore copper tubes are provided, said copper tubes being all parallel, and the tubes of the one system 2 being located alternately to and in metallic contact with those of the other system 4. The system of copper tubes 2 is connected with a pipe 3, while the system of tubes 4 is connected with a pipe 5 having a valve 6. Exchanger 1 is furthermore provided with an exit pipe 7 having a valve 8, and a pipe 9 connecting the exchanger with a receiver 10.

The lower ends of tubes 2 are connected to pipe 11 discharging into receiver 10, a valve 12 being interposed in pipe 11 between exchanger 1 and receiver 10; the lower ends of tubes 4 are connected to pipe 13 in turn connecting with the receiver 10 by means of the discharge pipe 14 of the receiver 10, said pipes 13 and 14 being provided with valves 15 and 16 respectively. Receiver 10 is furthermore provided with a manometer 17, one branch of said manometer being connected to the receiver at the upper part thereof close to the entrance of pipe 11 and the other branch being connected to the receiver at the bottom thereof near discharge pipe 14. The pipes 5 and 7 are provided with flow gages 18 and 19 connected in behind the valves 6 and 8 respectively. $P^1$, $P^2$, $P^3$ and $P^4$ denote pressure gages provided in the entrance pipe 3, pipes 5 and 7 and receiver 10 respectively.

My invention can be carried out in various ways and is not dependent on the use of particular forms of apparatus, but referring to the one described above as an example I prefer to proceed as follows in the operation of my new process.

I pass natural gas at a rate of about 15 cu. ft. per minute and compressed to a pressure $P^1$=about 800 lbs. per square inch, through pipe 3 into the small bore copper tubes 2 traversing in parallel exchanger 1, which latter may be in the form of a long pipe, for example 24 ft. long by 1½ inches diameter. If the process is carried out on a larger scale the losses from various sources are not so great and the applied pressure may be reduced; for instance with a gas rate of 120 instead of 15 cu. ft. per minute, using a proportionately larger apparatus, the pressure required is approximately only 400 to 600 lbs. instead of 800 lbs.

The compressed gas is cooled and partially liquefied in passing down the tubes 2 and is then expanded through valve 12 into the receiver 10. The liquefied portion, consisting of practically all of the hydrocarbons other than methane, plus an amount of methane, which may be varied at will between wide limits, but which in this example, if measured by volume in the gaseous state, is approximately equal in amount to that of the other hydrocarbons, collects in the bottom of the receiver. The portion of gas not liquefied passes back up the exchanger 1 and out through pipe 7. The pressure $P^3$ is kept at about 5–15 lbs. and is regulated by valve 8.

The liquefied portion is also permitted to flow back up through the exchanger as it is forced to flow through pipes 14 and 13 and tubes 4, the rate of off-going gas being measured by the flow gage 18, the flow being controlled by valve 6 or the valve 15. It is here that the essential point in my invention comes in, inasmuch, as the reëvaporation of the liquefied portion of the natural gas takes place progressively, with a continually rising boiling point, during the time the liquefied portion is moving upward through the exchanger in counter current to the incoming compressed gas. Since the top of the exchanger is at room temperature, it thus becomes possible for the less volatile components, such as $C_4H_{10}$ (B. P. 0° C.) to evaporate completely before reaching the top of the exchanger, thereby helping to cool a fresh portion of compressed natural gas coming down through tubes 2. In this way the latent heat of evaporation of all the liquefied constituents is practically completely regained, for the reason that the evaporation itself, as well as the flow of gases, follows the counter current principle of temperature exchange, which was not the case in the processes of the prior art.

The beneficial effect of my invention may be obtained within a greatly varying range of conditions. When the pressure $P^1$ is higher than is necessary, liquid tends to accumulate in receiver 10, and is drawn off through valve 16; but it is easy to find a pressure $P^1$ such that the level of liquid in 10 remains constant, as is indicated by the manometer 17, which is of the type commonly used for liquefied gas.

By opening valve 6 (or valve 15) wider, the liquid will, of course, flow more rapidly out of the receiver 10, and a larger proportion of the off-going gas will leave the system as the hydrocarbon portion, as shown by the flow gages 18 and 19. In so doing, however, the larger flow of liquid through valve 15 will in turn liquefy a correspondingly larger proportion of the natural gas which is discharged into the receiver 10 through pipe 11, consequently although the liquid runs out of the receiver at a higher rate, it also enters it at a higher rate. The result is that the liquid level is not essentially affected (except temporarily) and that $P^1$ may be held at about the same point while the distribution of the total off-going gas from the exchanger between the "methane" leaving through the valve 8 and the "higher hydrocarbons" leaving through valve 6 is varied within wide limits.

The more methane permitted to pass out with the hydrocarbons the purer is the methane which leaves through valve 8, but the smaller, of course, is the yield of the latter. However, in the case described, starting with natural gas of the composition given above, it was found possible to obtain a manufacturing yield equivalent to about 75% of the volume of the original natural gas, or to about 88% of the methane content of the latter, in the form of methane containing (besides a small amount of nitrogen) only about 0.1% by volume of other hydrocarbons; and this at a pressure much less than when the method of evaporating the liquid in counter current was not employed.

It is further to be noted that even though a natural gas should contain, say 28% of higher hydrocarbons, instead of about 14% as in the example given, the method of my invention may be used practically without increase in compression (though the manufacturing yield will, of course, be lower), while in the application of the processes of the prior art the pressure must be still further raised in order to take care of the large increase in the latent heat corresponding to the increased amount of high boiling constituents.

It is thus evident that by the device of the counter current of evaporating liquid as above described, there is obtained in the extraction of methane from natural gas a regeneration of "cold" which is essentially as complete as in the extraction of oxygen and nitrogen from air, in spite of the presence of high boiling constituents in the natural gas which make regeneration very incomplete if carried on according to the methods of the prior art.

From the practical standpoint moreover, the method gives a high yield of an extremely pure methane gas, with a low power consumption, while it possesses a great degree of flexibility in handling natural gas of varying composition, and a simplicity of construction and operation of apparatus due to the absence of a rectifying column, though the latter might be added if desired, thus increasing the already high yield of methane obtained without a rectifying column.

It may be further noted that by making the separation of gas from liquid after the expansion instead of before expansion, as has been done in some gas separation processes, a much sharper separation is obtained, with a correspondingly purer methane, that is one containing only 0.1% of higher hydrocarbons as already mentioned. On the other hand by separating before expansion, there is still left in the methane gas produced an impurity amounting to about 3% of higher hydrocarbons, and such a methane is so impure that for many manufacturing purposes such a purification process is not worth while carrying out.

It is furthermore to be understood that the compressed natural gas before entering my apparatus described above may be dried by any suitable method, such as by the use of calcium chlorid or by refrigeration, (for instance to —30° C. by the use of an ammonia ice machine). I prefer, however, to reach the same result by means of the expansion cold itself; for instance by having the exchanger in duplicate, and shifting the operation from one exchanger to the other when the accumulation of ice in the first has become serious.

I claim.

1. The process of separating the lower boiling constituents or constituent from a gas mixture containing besides these constituents a number of higher boiling constituents whose individual boiling points cover a wide range of temperature, consisting in conducting the compressed gas mixture through one channel of a temperature exchanger, expanding it, separating the liquefied portion from the non-liquefied portion, passing the non-liquefied portion through a second channel of the exchanger in counter current to the incoming compressed gas, evaporating the liquefied portion at a progressively rising temperature by passing it through the lower part of a third channel of the exchanger in counter current to the incoming compressed gas, and leading the gas produced by the evaporation through the upper part of the third channel in counter current to the incoming compressed gas.

2. The process of separating methane from natural gas, consisting in conducting compressed natural gas through one channel of a temperature exchanger, expanding it, separating the liquefied hydrocarbons, passing the non-liquefied gas through a second channel of the exchanger in counter current to the incoming compressed gas, evaporating the liquefied hydrocarbons at a progressively rising temperature by passing them through the lower part of a third channel of the exchanger in counter current to the incoming compressed gas, and leading the gas produced by the evaporation through the upper part of the third channel of the exchanger in counter current to the incoming compressed gas.

In testimony whereof I have signed this specification.

BURRITT S. LACY.

Witnesses:
MARION SULLIVAN,
LILLIAN D. WOOD.